United States Patent [19]

Pope

[11] Patent Number: 4,589,077
[45] Date of Patent: May 13, 1986

[54] LIQUID LEVEL AND VOLUME MEASURING METHOD AND APPARATUS

[75] Inventor: Woodrow W. Pope, Garland, Tex.

[73] Assignee: Southwest Pump Company, Plano, Tex.

[21] Appl. No.: 517,590

[22] Filed: Jul. 27, 1983

[51] Int. Cl.⁴ .................... G01F 23/26; H01G 5/28; H01G 5/34

[52] U.S. Cl. .................. 364/509; 73/304 C; 361/284

[58] Field of Search .............. 364/509, 560, 561, 562, 364/424, 442, 510; 73/304; 361/284

[56] References Cited

U.S. PATENT DOCUMENTS

| | | | |
|---|---|---|---|
| 3,918,306 | 11/1975 | Maltby | 73/304 C |
| 4,003,259 | 1/1977 | Hope | 361/284 |
| 4,038,871 | 8/1977 | Edwards | 73/304 C |
| 4,090,408 | 5/1978 | Hedrick | 73/304 C |
| 4,099,167 | 7/1978 | Pomerantz et al. | 361/284 |
| 4,176,553 | 12/1979 | Wood | 361/284 |
| 4,194,395 | 3/1980 | Wood | 361/284 |
| 4,349,882 | 9/1982 | Asmundsson et al. | 73/304 C |
| 4,399,699 | 8/1983 | Fujishiro | 73/304 C |
| 4,417,472 | 11/1983 | Tward | 73/304 C |
| 4,417,473 | 11/1983 | Tward et al. | 73/304 C |
| 4,418,571 | 12/1983 | Asmundsson et al. | 73/304 C |
| 4,448,071 | 5/1984 | Tward | 73/304 C |
| 4,448,072 | 5/1984 | Tward | 73/304 C |

*Primary Examiner*—Felix D. Gruber
*Attorney, Agent, or Firm*—Harold E. Meier

[57] ABSTRACT

A liquid level height within a tank is measured by means of an elongated multi-segment capacitance probe that includes a column of capacitors extending through a liquid level interface. Each capacitor of the probe is sequentially measured in response to microprocessor controlled instructions as part of a measuring unit located at the tank. Up to sixteen measuring units may be interconnected in a field and individually connected to a microcomputer system at a central station. The microcomputer system addresses each of the measuring units and sends a select signal to the microprocessor controller of the measuring unit to sequentially measure each capacitor of the probe. By identifying the capacitor at the liquid level interface, the height of liquid within a tank is computed by the microcomputer system. From this height measurement and stored tank data, the volume of liquid within a tank is calculated. Associated with each of the capacitors of the probe is a temperature sensor for generating a temperature correction factor for the volume calculation.

21 Claims, 7 Drawing Figures

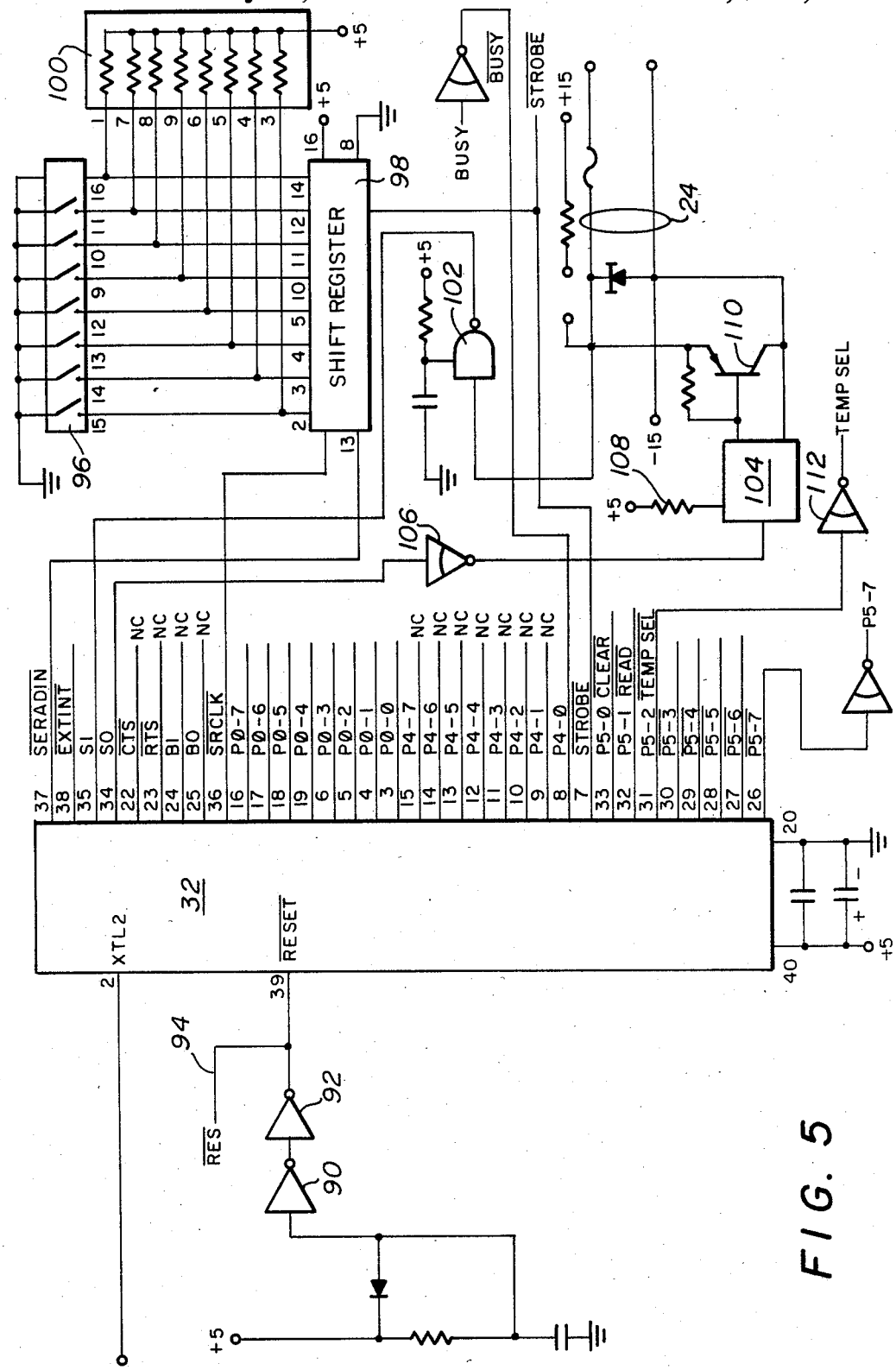
F I G. 5

LIQUID LEVEL AND VOLUME MEASURING METHOD AND APPARATUS

TECHNICAL FIELD

This invention relates to the measurement of a liquid level interface for volume measurement in a tank, and more particularly to a method and apparatus for measuring the liquid level and volume of liquid within a tank using an elongated multi-segment capacitor probe.

BACKGROUND ART

Retail businesses for servicing vehicles with fuel requirements are commonly constructed with a plurality of underground storage tanks. Typically, such a "service station" may have one or more underground storage tanks for "leaded" and "unleaded" gasoline and in these categories multiple underground storage tanks for different octane ratings. In addition, a service station may have one or more underground diesel fuel tanks. Also, it is not uncommon for such service stations to have an underground storage tank for kerosene. To operate such stations as a profitable business it becomes important for the proprietor to know the amount of inventory of each fuel stored in the underground tanks. Considering that present underground storage tanks may hold several thousand gallons of fuel, the proprietor has a considerable investment in inventory at any one time.

Also for purposes of insuring continuing availability of each grade and octane rating of fuel it becomes important to periodically measure the volume of fuel in each underground tank for reordering purposes. With the continued proliferation of self-service stations which "pump" many gallons of fuel per day through automatic vending devices, it becomes more important for a proprietor of such a station to know the volume of fuel in each of the underground storage tanks.

One of the original and simplest techniques for measuring the volume of fuel in an underground storage tank is by use of long graduated measuring stick. An operator opened an access port in the top of each tank and lowered the measuring stick to the bottom and observed the wet-dry (liquid level) interface on the measuring stick. This number was then used to manually calculate the volume of fuel in the tank.

There has been a considerable advance since the measuring stick in techniques available for determining the volume of fuel in an underground tank. One such system is described in U.S. Pat. No. 4,349,882. This system utilizes an elongated multiple segment capacitance probe mounted in each storage tank. The liquid level and the volume of fuel in a tank is periodically measured by a microcomputer connected to the capacitance probe. U.S. Pat. No. 3,777,257 also describes apparatus that utilizes a capacitance probe for measuring the volume of fuel within a tank. These two patents are representative of systems available that replace the measuring stick for determining the volume of fuel in an underground storage tank.

Each of the presently known measuring systems that utilize a capacitance probe rely on the dielectric difference of the fuel as compared with the dielectric of air. It has been determined that the capacitance of the probe varies linearly as the probe becomes more fully submerged by fuel. This is based on the change in capacitance when the probe is exposed along its entire length to air as when the probe is completely submerged in a fuel. However, to accurately measure the height of liquid (fuel) and from the height measurement, calculate the volume, the dielectric constant of the liquid within the tank must be known and used in the computation of height or volume. Systems heretofore available relied on preset capacitor calibrations utilizing published values of dielectric constants for the liquid that was thought to be stored in a tank. This reliance on published dielectric constants results in inaccurate volume and height measurements.

In accordance with the present invention, the dielectric constant of the liquid within a tank is determined and then utilized in computing the liquid height measurement and in turn calculating the volume of fluid within the tank. The dielectric constant of the liquid within the tank is determined by measuring the capacitance value of a capacitor completely submerged by liquid. This capacitance value is then used in calculating liquid height and in turn computing volume.

DISCLOSURE OF THE INVENTION

In accordance with the present invention there is provided a method of measuring the location of a liquid level in a tank by means of an elongated multi-segment capacitance probe that includes a column of capacitors extending in a direction through the liquid interface. The method includes the step of identifying the capacitor in the column at the liquid level by measuring the capacitance value for a capacitor and comparing this measured value with a stored capacitance value. Another step in the method is the measurement of the capacitance value of a capacitor in the column below the identified capacitor at the liquid level. From the measured capacitance value of the capacitor at the liquid level and the measured capacitance value of a capacitor below the liquid interface, the height of the liquid level within the tank is computed.

To measure the volume of liquid within a tank the computed height of the liquid level is used along with stored volume calibrations for the particular tank.

The volume of water within the tank is computed from the capacitance value of the lowermost capacitor in the probe and comparing this measured value with a stored value representing the capacitor submerged in water and also comparing the measured value with a stored capacitance value of the capacitor submerged in a non-water liquid. From these comparisons the volume of water within the tank is calculated and this volume is subtracted from the computed liquid volume to provide a more accurate liquid volume measurement.

The temperature of the liquid at the capacitance probe is also measured and a temperature compensation factor determined. This temperature compensation factor is used along with the computed volume to provide a more accurate measurement of liquid volume within a tank.

Also in accordance with the present invention, an elongated, multiple segment capacitor probe for use in a measuring system for locating a liquid level interface includes a support having an elongated center section as one plate of a plurality of capacitors. A first plurality of flat capacitor plates is mounted in a spaced apart overlapping arrangement to the center section of the support along a longitudinal axis and parallel therewith. A second plurality of flat capacitor plates is also mounted in a spaced apart overlapping arrangement to the center section of the support along the longitudinal axis thereof and in a position opposite and displaced from the first plurality of capacitor plates. Each of the capacitor plates comprises an individual capacitor with the center section of the support.

Mounted within close proximity of each of the capacitors of the multi-segment probe is a temperature sensor for generating the temperature compensation factor signal. One such temperature sensor is located at each of the capacitors along the extended length of the probe.

BRIEF DESCRIPTION OF THE DRAWINGS

A more complete understanding of the invention and its advantages will be apparent from the following detailed description taken in conjunction with the accompanying drawings.

Referring to the drawings:

FIG. 5 is a schematic of the microprocessor and address selector of the system of FIG. 1;

DETAILED DESCRIPTION

Figure 1:
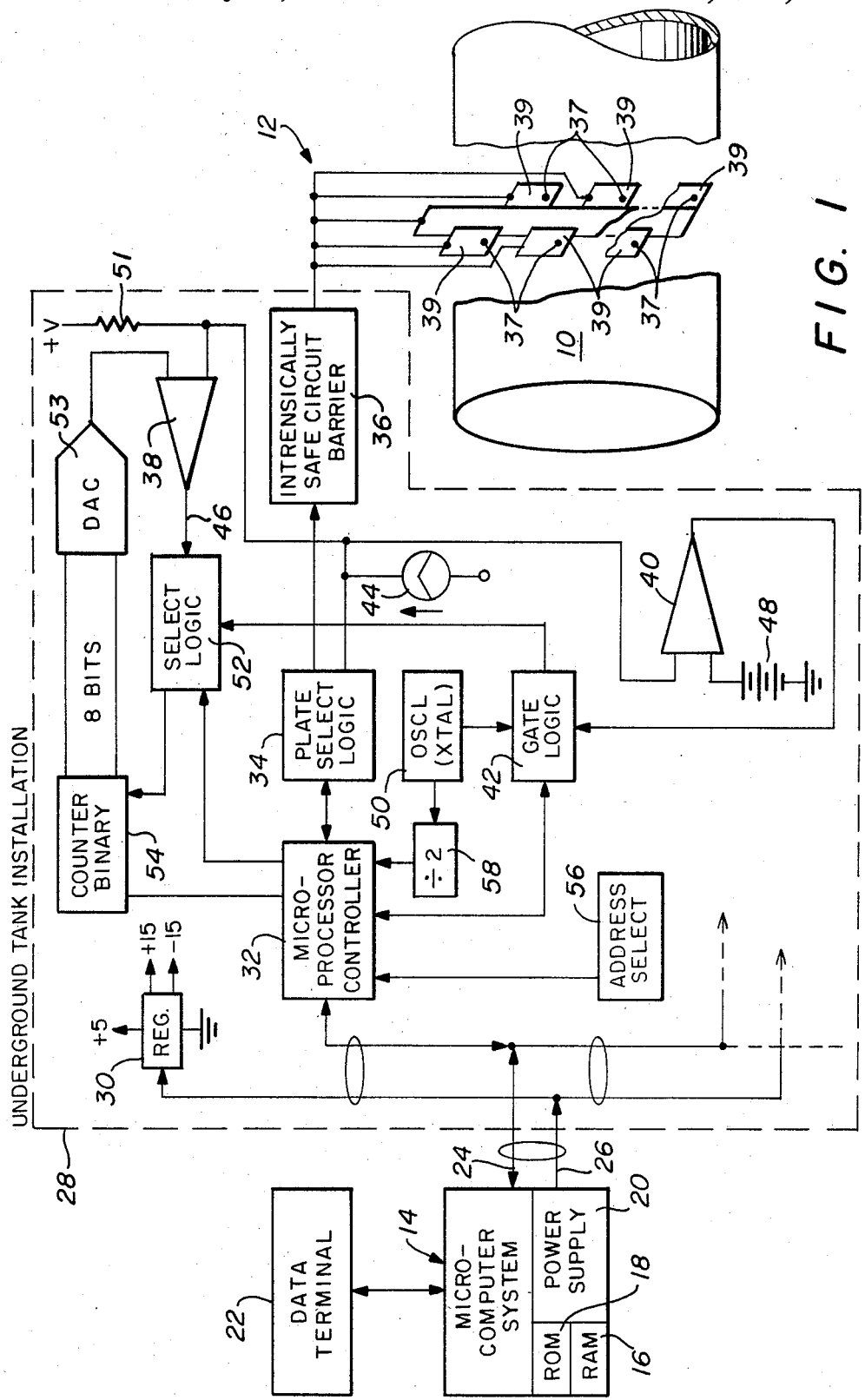
FIG. 1 is a block diagram of a fluid level and volume measuring system connected to a schematically illustrated elongated, multi-segment capacitance probe.

Referring to the drawings, and specifically to FIG. 1, there is illustrated the invention for measuring the liquid level and volume of liquid within a tank 10 by means of an elongated, multiple segment capacitance probe 12. Typically, the system of the present invention is used for measuring the volume of fuel within an underground storage tank such as commonly found in automobile and truck service stations. The volume of fuel within the tank 10 is determined by measuring the height of the liquid level/air interface by means of the multiple segment probe 12. The probe is mounted through a port in the top of the tank 10 and extends through the liquid level interface to the bottom of the tank. Underground fuel storage tanks are generally mounted with their longitudinal axis horizontal and thus FIG. 1 illustrates the usual orientation of the capacitance probe 12 and the tank 10. However, it should be understood that the probe 12 may be mounted along the longitudinal axis of the tank 10 for a measurement of the volume of fuel or other liquid therein.

To measure the volume of fuel within the tank 10, the probe 12 is connected to a microcomputer controlled measuring system including a microcomputer 14 consisting of a conventional microprocessor such as a Z80, marketed by Mostek Corporation of Dallas, Tex. The microcomputer 14 has the usual random access memory 16, read only memory 18 and necessary power supplies 20. The volume of liquid within the tank 10 and other data generated by the system of FIG. 1 is provided in a human readable format on a data terminal 22 connected to the microcomputer 14. Typically, the microcomputer 14 and the data terminal 22 are located remote from the remainder of the system illustrated in FIG. 1 and usually within an enclosure for the service station.

Connected to the microcomputer 14 by means of a two-wire serial data link 24 and a four-wire unregulated DC voltage line 26 are up to sixteen tank measuring units 28. Only the details of one of the sixteen tank measuring units 28 is illustrated in FIG. 1. Typically, the measuring unit 28 is mounted underground at the tank 10.

Each measuring unit 28 connected to the microcomputer 14 includes a regulated power supply 30 for providing regulated voltages to the other components of the measuring unit. Connected to the two-wire serial data link 24 is a microprocessor controller 32 capable of serial communication for recognizing and responding to a unique address on the two-wire serial data link. The unique address, one of up to sixteen, identifies a particular storage tank 10. This unique address is generated by the microcomputer 14 and enables the identification of measurement data with a particular storage tank.

Functioning with the microprocessor controller 32 to measure of the volume of liquid within the tank 10 is a plate select logic network 34 that identifies which of the capacitors of the probe 12 is being analyzed at any given time. The plate select logic 34 communicates with the probe 12 through a barrier circuit 36 that provides intrinsically safe interconnection between the probe 12 and the plate select logic network 34. Typically, the barrier circuit 36 consists of a network of current limiting resistor, for example 470 ohms, as will be described.

Measurement data from the probe 12 is provided through the logic network 34 to a differential comparator 38 (temperature compensation) and a differential comparator 40. Connected to the differential comparator 40 is a constant current generator 44. The differential comparator 38 is connected to resistor 51 providing a current to voltage conversion for a current input from the temperature sensors 37 on the plates 39. The eight bit output of the binary counter 54 feeds a digital-to-analog converter 53 which in turn feeds the differential comparator 38. Thus, the output of the differential comparator 38 on the line 46 is the difference between the output of the DAC 53 and the voltage produced by temperature sensors 37.

A temperature measurement is made at this time by first, selecting a temperature sensor by means of the plate select logic 34; second, steering the oscillator output 50 through select logic 52 into the binary counter 54; third, allowing the output of the binary counter 54 to count the input of the digital-to-analog converter 53 upward from a count of zero until the analog output of the converter 53 matches the voltage across resistor 51; and fourth, causing the output of the differential comparator 38 on line 46 to change, stopping the oscillator input to the counter. The count in the binary counter 54 now represents the temperature of the sensor 37. It is then transferred to the microprocessor controller 32 and sent back to the microcomputer 14.

The output of the current generator 44 charges the capacitance of a selected plate. A charge voltage on a capacitor is input to the differential comparator 40 to be compared with a reference voltage 48 to control the gate logic 42.

Connected to the gate logic 42 is the microprocessor controller 32 and a crystal controlled oscillator 50. The gate logic 42 connects the oscillator output to the select logic network 52 that also receives the frequency signal of the converter 38 on the line 46. Operationally, the controller 32 controls the select logic network 52 to couple the frequency signal of the line 46 or the oscillator output from the gate logic 42 to a binary counter 54. The binary counter 54 provides measurement information from the probe 12 to the microprocessor controller 32.

Also connected to the microprocessor controller 32 is address select logic 56 and a frequency signal from the oscillator 50. The frequency signal from the oscillator 50 is provided to the microprocessor controller 32 through a divide-by-two network 58 for clock operations.

Operationally, the system of FIG. 1 is controlled by the microprocessor controller 32 which is in serial communication with the microcomputer system 14 over the two-wire serial data link 24. The microprocessor controller 32 responds to a unique address (one of 16) on a common party line. A command is received over the serial data link 24 identifying the address of a particular measuring unit 28 to select one of the capacitors of the probe 12. By means of the plate select logic 34, the microprocessor controller 32 selects the identified capacitor of the probe 12 and sends a select complete message over the data link 24 to the microcomputer system 14. Next the microcomputer system 14 through the data link established to the microprocessor controller 32 commands the controller 32 to begin a capacitance reading cycle for the selected capacitor. By means of the gate logic 42, the output of the constant current generator 44 begins to charge the identified capacitor through the plate select logic 34. As the charge voltage on the capacitor builds up linearly, it is monitored by the differential comparator 40 and compared to the reference voltage 48. When the charge voltage reaches the reference voltage, the comparator output switches, sending a signal to the gate logic 42.

At the same time as the gate logic 42 started charging the capacitor from the constant current generator 44, the output of the crystal oscillator 50 is connected to the binary counter 54 by means of the gate logic 42 and through the select logic 52. During the time interval between the start of the capacitor charge and the generation of an output signal from the comparator 40 to the gate logic 42, a count is accumulated in the binary counter 54. Thus, the binary count in the counter 54 starts when the charging of the capacitor begins and continues to increase until the charge voltage reaches the reference voltage. At that time, the gate logic 42 disconnects the oscillator 50 from the binary counter 54. Thus, the count in the binary counter 54 is linearly proportional to the capacitance of the selected capacitor. This binary count is a measure of the time required to charge a capacitor by means of the constant current generator 44 from a zero voltage to a fixed voltage level.

When the gate logic 42 receives a signal from the differential comparator 40, it also sends an instruction to the microprocessor controller 32 that the capacitance measurement cycle has been completed. The microprocessor controller 32 then addresses the binary counter to transfer the stored count in the counter 54 to the microcomputer system 14. This completes a read cycle for one of the capacitors of the probe 12. The microcomputer system 14 then instructs the microprocessor controller 32 to begin a read cycle for another capacitor of the probe 12, that is, unless all capacitors of the probe have been read.

A typical measurement sequence for all the capacitors of the probe 12 for one of the measuring units 28 is initiated from a command by the microcomputer system 14. The microcomputer system 14 stores in memory system programs for completing a measurement sequence for any one of up to 16 probes 12 by means of the interconnected measuring unit 28. The microcomputer system 14 also includes sufficient non-volatile memory for storing the minimum (empty) binary count representing the capacitance of each capacitor in a dielectric of air and it also has sufficient memory to store a maximum (immersed in fuel) binary count representing the capacitance of each capacitor when submerged in a fuel. Thus, the microcomputer system 14 is connected to sufficient memory to store the minimum and maximum binary count for up to 20 capacitors of a probe and for up to 16 probes. A feature of the present invention is that the minimum and maximum binary counts are initial calibrations depending on the fuel in the tank 10 and these values are not changed during the operation of a measurement sequence.

A measurement sequence completed by means of a microcomputer system 14 commences by identifying a particular probe 12 by selecting the address of the interconnected measuring unit 28. The individual capacitors of the probe 12 are measured starting with the top capacitor and proceeding downward toward the lowermost capacitor. Each time a binary count is transferred from the counter 54 to the microcomputer system 14, it is compared with the empty value binary count stored in memory. So long as the comparison indicates that the binary count represents a capacitor that does not have any part thereof submerged in fuel, the sequence of measuring capacitance continues downwardly. This sequence continues until the comparison identifies the capacitor which is partially submerged in fuel. By identifying this capacitor in the probe, the liquid level within the tank 10 is identified to within the length of the capacitor, which, for example, may be six inches. It will be recognized that the position of each capacitor of the probe 12 within the tank 10 is known as a result of the positioning of the individual capacitors on the probe during assembly and also the mounting of the probe in the tank during installation.

After the capacitor at the liquid level has been identified, the microcomputer system 14 instructs the microprocessor controller 32 to measure the capacitance of the next capacitor below the liquid level and which is completely submerged in fuel. The measured value of this submerged capacitor in the form of a binary count in the counter 54 is transmitted to the microcomputer system 14 and compared with the stored value for that capacitor, completely submerged in fuel. A correction factor is calculated to adjust for the actual capacitance as meaured and the stored value.

Next, the microcomputer system 14 instructs the controller 32 to again measure the capacitor at the liquid level. The capacitance of this capacitor is read ten times and averaged. The averaged value is then corrected using the correction factor calculated as a result of the measurement of the first submerged capacitor. The height of the liquid level within the tank 10 is then calculated by adding the height of the number of capacitors, completely submerged in fuel to the calculated length of the capacitor partially submerged at the liquid level. Using the height of the liquid level within the tank 10, the volume of fuel within the tank is calculated using stored volume data. As will be explained, this volume calculation will be temperature compensated.

Data representing the height of liquid within the tank 10 and also the volume of fuel therein is transferred to the data terminal 22. The data terminal provides the human interface to the system and includes controls to allow an operator to request a particular tank reading, the time and date, calibrate a probe of any tank, calibrate the tank or place the system in automatic operation, whereby all the tanks are polled on a regular schedule (programmable) and checked for drop in level.

Figure 2:
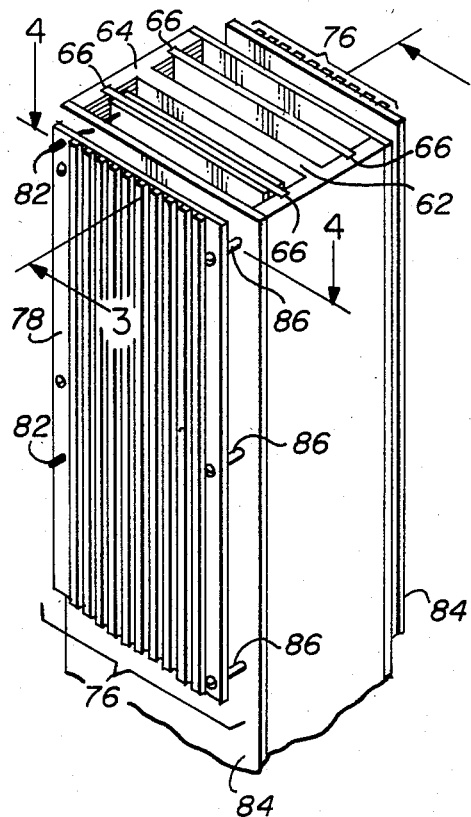
FIG. 2 is a partial pictoral section, showing the elongated, multiple segment capacitance probe illustrated in FIG. 1.
Figure 4:
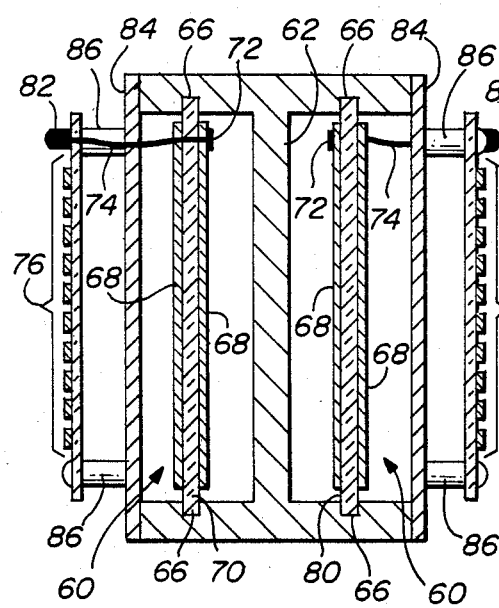
FIG. 4 is a top view of the probe of FIG. 2 taken along the line 4—4.
Figure 3:
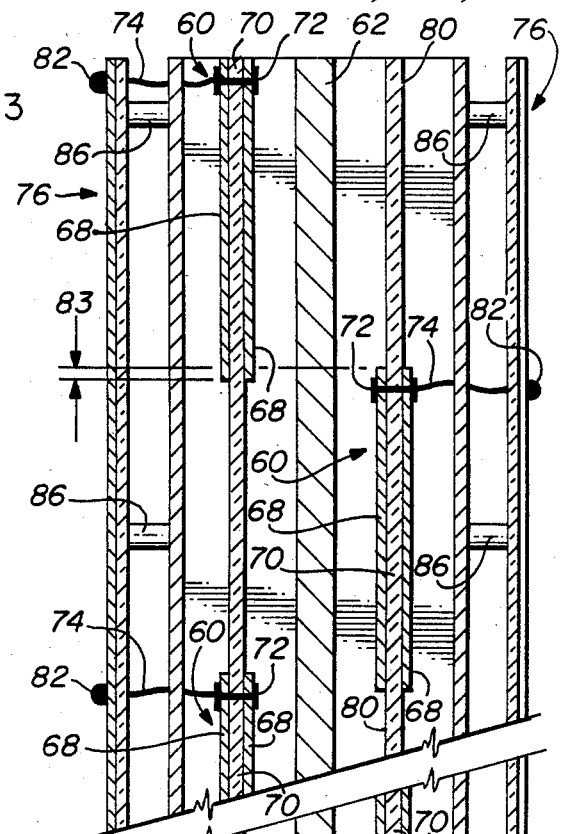
FIG. 3 is a cross section view of the probe of FIG. 2 taken along the line 3—3.

Referring to FIGS. 2-4, there is shown in detail an elongated multi-segment capacitor probe 12 for use in the fluid level and volume measuring system of FIG. 1. Using a ten foot probe for purposes of explanation, there are twenty flat plate capacitors 60 each approximately six inches long and mounted alternately every six inches on opposite sides of a common plate 62 extending the length of the probe 12. As best illustrated in FIGS. 2 and 4, the common plate 62 is part of an I-beam support 64 of an electrically conductive material such as aluminum. Grooves 66 are extruded in the caps of the I-beam 64 to support the capacitors 60.

Each of the capacitors 60 comprises two flat copper plates 68 etched on opposite sides of an insulating substrate 70. The plates 68 are etched onto the substrate 70 using conventional printed circuit board techniques. The copper plates are interconnected to the substrate 70 by a feed through connection 72 that is connected by means of a lead 74 to one of the cables 76 on a printed circuit cable board 78.

To support the printed circuit cable board 78 to the probe 12 and to form the outside common plate of the capacitors, a cap 84 is attached to each side of the I-beam support 64. This construction provides a self-shielding co-axial capacitor probe.

The printed circuit cable boards 78 are attached to the respective caps 84 by means of standoffs 86. The lower end of the assembly is positioned to the bottom of the tank 10 such that the assembly is submerged in fuel up to the liquid level within the tank.

As best illustrated in FIGS. 2 and 3, each of the substrates 70 for one of the capacitors 60 is inserted into the grooves 66 to form the capacitance probe. The lowermost capacitor is positioned opposite a spacer 80. The probe is then built up alternating on opposite sides of the common plate 62 either one of the capacitors 60 or one of the spacers 80. Note that the spacers are dimensioned such that the copper plates of opposite capacitors overlap for some distance such as shown at 83. This overlap enables the measuring system of FIG. 1 to accurately measure the height of liquid (fuel) within the tank 10 without ambiguity caused by spacing between opposite capacitors.

In operation of the multi-segment capacitor probe 12, it is mounted into the tank 10 through a standard fitting as explained above. As fuel fills the tank, it enters the empty space surrounding the capacitors and the common plates 62 and 84. As fuel rises in the probe, the capacitance of each of the capacitors changes in a linear relationship from a value where the dielectric is air to a value with fuel as the dielectric. Typically, the dielectric change between fuel and air is two to one. As explained previously, with the calibrated empty and full binary count values stored in the microcomputer system 14 for each plate of the probe 12, any liquid level height between zero and full is calculatable.

Also associated with each of the capacitors of the probe 12 is a temperature sensor 82. Each of the temperature sensors 82 is connected to the cable 76 for the associated capacitor 60. Each temperature sensor may be monitored from the measuring unit 28 independent of a measurement of the capacitor 60. However, the select address of a temperature sensor in the measuring sequence is the same as the associated capacitor.

As previously explained, the capacitance of each capacitor is measured by operation of the measuring unit 28 and the microprocessor controller 32. Following the sequence during which the liquid level height within the tank 10 is determined, the microcomputer system 14 addresses the microprocessor controller 32 to commence a read cycle for temperature measurement. A voltage is applied to a common lead for all of the temperature sensors 82 which are isolated from each other by diodes (not shown). A temperature sensor is selected on the same basis that a capacitor is selected as previously explained by means of the microprocessor controller 32.

The current through the selected temperature sensor 82 resulting from an applied voltage is connected to the resistor 51 at voltage comparator 38 through the plate select logic 34. This current is converted to a voltage proportional to temperature by the resistor 51. The select logic 52 is activated to connect the output of the comparator on the line 46 to the binary counter 54. A binary count is accumulated in the binary counter proportional to the temperature of the probe being addressed. The microcontroller 32 activates the counter 54 clock through gate logic 42. This causes the counter 54 to count up causing the digital-to-analog converter 53 output to rise toward the voltage across resistor 51.

When the output of the digital-to-analog converter 53 matches the voltage across resistor 51, the comparator 38 output stops the clocks to the counter 54 through select logic 52, stopping the count of the counter 54. At the end of this cycle, the count in the binary counter 54 (which is proportional to temperature) is transmitted through the microprocessor controller 32 to the microcomputer system 14 over the serial data link 24 as described previously with reference to the capacitance measurement cycle.

The temperature measurement for each of the completely submerged plates is used in the microcomputer system 14 to compensate the capacitance measurement for each capacitor section. Thus, before the final data representing a liquid volume is computed, the measurement is temperature compensated by measuring temperature in 6" high volume sections.

An additional function of the system of the present invention is to periodically check each tank 10 for any water accumulation. When the microcomputer system 14 is placed in the test mode of operation, it transmits the address of a selected tank 10 by means of the two wire serial data link 24 to the interconnected measuring unit 28. Also transmitted to the measuring unit 28 is the address of the lowermost capacitor of the probe 12 which is completely coated with an insulating epoxy as water is conductive and would short out the capacitor. The capacitance of this lowermost capacitor is measured as previously explained for any capacitor on the probe 12. This measured value of capacitance represented in the form of a binary count in the counter 54 is transmitted to the microcomputer system 14. The microcomputer system 14 compares the measured value to the stored fully submerged in fuel value and also a stored value for the capacitor completely submerged in water. Typically, the value of a capacitor of the probe 12 submerged in water is forty times that of the same capacitor submerged in fuel. By a computation utilizing the measured value, the stored fully submerged in fuel value, and the stored fully submerged in water value, the volume of water in a tank 10 is computed. To compensate the calculated value for temperature, a temperature reading for the second lowest capacitor on the probe 12 is used to correct for the previously determined calculation of the amount of fuel at the lowermost plate. This computation of water within the tank 10 is then utilized to improve the accuracy of the fuel computed volume and to warn of increasing height of water in the tank.

Referring to FIG. 5, there is shown a detailed schematic of the microprocessor controller 32 including the address select logic 56. The microprocessor 32 is a conventional processor, for example, a Model SCU-20, manufactured and sold by Mostek Corporation. Connected to the microprocessor 32 is a reset circuit including inverting amplifiers 90 and 92 with a reset pulse generated on a line 94. Pins 36 and 37 of the microprocessor 32 are connected to the address select logic 56 that consists of a switching network 96 and a parallel loaded shift register 98. The latter may typically be a 74LS166, manufactured and sold by Texas Instruments and the former may typically be an 8-position DIP-switch, manufactured and sold by CTS. Tied to the interconnecting lines between the switching network 96 and the selector logic 98 is a resistor matrix 100 used as logic level pull-ups.

Connected to the pins 34 and 35 of the microprocessor 32 is the two wire serial data link 24 through circuitry that includes a NAND gate 102 and an optical isolator 104. One input of the optical isolator 104 is tied to an inverting amplifier 106 and a second terminal is tied to a power supply through a resistor 108. Output terminals of the optical isolator 104 are tied to the data link 24 through an amplifier 110. The NAND gate 102 is connected to one of the two wires of the data link 24 and has an output terminal connected to pin 35 of the microprocessor 32.

Also tied to the microprocessor 32 are data lines PO-0 to PO-7 from the binary counter 54. These lines carry the binary count representing the capacitance measurement or the temperature measurement from the probe 12.

Line P4-0 of the microprocessor 32 receives a BUSY signal to indicate to the microcomputer system 14 that the microprocessor controller of a particular measuring unit 28 is busy. Pins 7 of the microprocessor is a strobe line connected to the address selector shift register 98 and also to the gate logic 42 as detailed in FIG. 7. Line P5-0, a CLEAR signal line, and line P5-1, a READ signal line, are also connected to the gate logic of FIG. 7. Line P5-2 carries the temperature select signal which appears at the output of an inverting amplifier 112 and is connected to the plate select logic 34 as detailed in FIG. 6. Lines $\overline{P5\text{-}3}$ through $\overline{P5\text{-}7}$ are output lines from the microprocessor 32 and are connected to the plate select logic 34 as detailed in FIG. 6.

Figure 6:
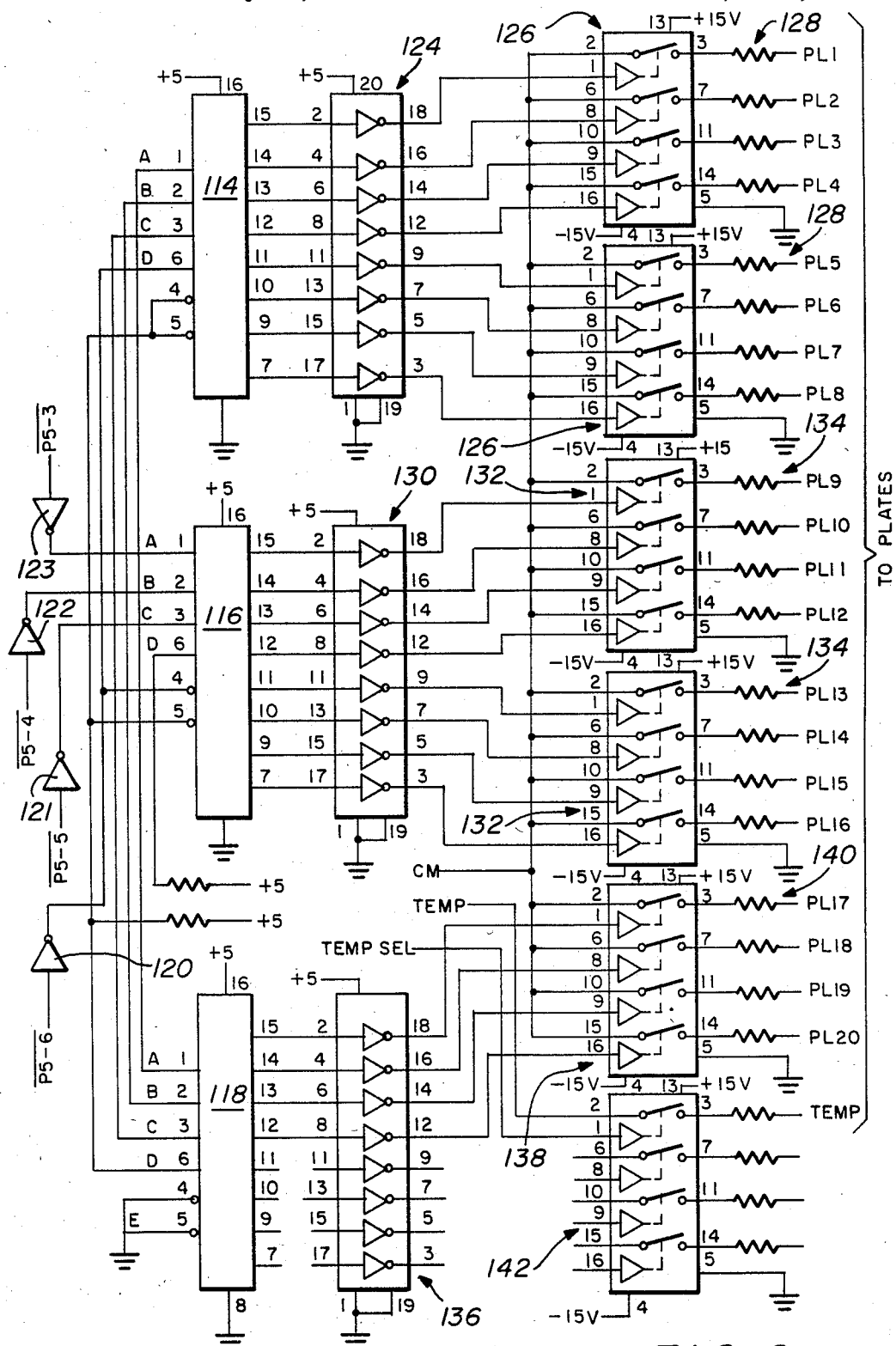
FIG. 6 is a schematic of the select logic decoder of the measuring system of FIG. 1.

Referring to FIG. 6, there is shown a detail of the plate select logic 34 including one-of-eight decoders 114, 116 and 118 connected to receive the $\overline{P5\text{-}3}$ through $\overline{P5\text{-}7}$ signals at the output of inverting amplifiers 120 through 123. Connected to the outputs of the decoder 114 is a bank of inverting amplifiers 124 which are individually connected to switching amplifiers 126. One terminal of each switch controlled by a switching amplifier is interconnected to the constant current generator 42 of FIG. 1. The second terminal of each of the switches illustrated with the amplifiers 126 is connected to a resistor 128 as a part of the intrinsically safe circuit barrier 36. Each of the resistors 128 is identified with a code relating to one of the capacitors of the probe 12. For example, the code "PL1" refers to the first capacitor or plate of the probe 12.

Connected to the decoder 116 is a bank of inverting amplifiers 130 having outputs connected to control switching amplifiers 132. Each switch controlled by the amplifiers 132 has one interconnected terminal to the constant current generator 42 and a second terminal connected to one resistor of a network 134 connected to code identified plates of the capacitors of the probe 12. Connected to the decoder 118 is a bank of inverting amplifiers 136, each having an output connected to control one switching amplifier in an amplifier network 138. Since there are twenty capacitors in the probe 12 as previously described, only four amplifiers are shown in the network 138 to measure all twenty of the capacitors of the probe. Each switch of the switching network 138 has one terminal interconnected to the constant current generator 42 and a second terminal individually connected to one resistor of a network 140. Again the resistors 128, 134 and 140 are part of the intrinsically safe barrier circuit 36 and are individually connected to one plate of a capacitor of the probe 12.

Also illustrated in FIG. 6 is a switching network 142 that receives the temperature select signal from the microprocessor 32 at the output of the inverting amplifier 112. The only switch connected in the switching network 142 has one terminal connected to turn on the temperature measuring signal. The second terminal of the switch is connected through a resistor 144 to the common temperature line of the probe 12.

Figure 7:
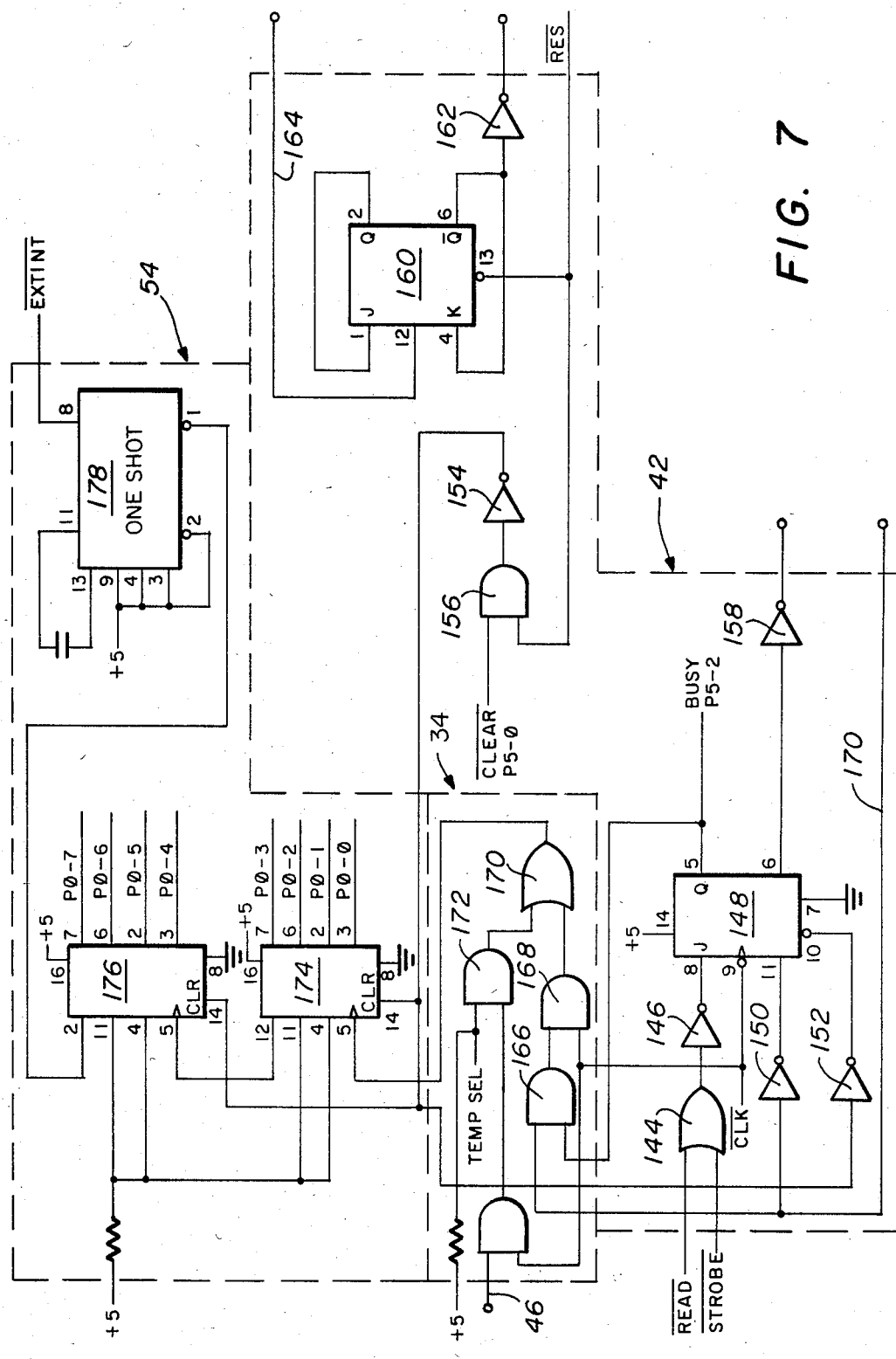
FIG. 7 is a schematic of the binary counter, select logic, and gate logic of the measuring system of the present invention.

Referring to FIG. 7, there is shown a detail of the gate logic 42, the plate select logic 34 and the binary counter 54. Referring specifically to the gate logic 42, it receives the READ signal and STROBE signal from the microprocessor 32 of FIG. 5 at an OR gate 144 connected through an inverting amplifier 146 to a J-K flip-flop 148. The K terminal of the flip-flop 148 is connected through an inverting amplifier 150 to the output line of the differential comparator 40. The flip-flop 148 is reset through an inverting amplifier 152 that, in turn, is connected to the output of an inverting amplifier 154 tied to a NAND gate 156 which receives the CLEAR signal of the microprocessor 32 and also the RESET signal from the amplifier 92 of FIG. 5. The $\overline{Q}$ bar output of the flip-flop 148 is connected through an inverting amplifier 158 to a shorting switch of the plate select logic 34.

The divide by two 58 is a J-K flip-flop 160 where the $\overline{Q}$ terminal is connected through an inverting amplifier 162 to the microprocessor 32. Terminal 12 of the flip-flop 160 is connected to the crystal oscillator 50 by means of a line 164.

The select logic 34, as shown in FIG. 7, includes interconnected NAND gates 166 and 168 with the former connected to the flip-flop 148 at the $\overline{Q}$ terminal and also connected to the constant current generator 44 by means of a line 170. A second input to the NAND gate 168 is a clock signal from the crystal oscillator 50. The output of the gate 168 is connected to an OR gate 170 that has a second input connected to a NAND gate 172 to couple the output of the frequency converter 38 to the OR gate.

The output of the OR gate 170 is connected to the binary counter 54 and, specifically, to terminal 5 of a register 174. Also included in the binary counter 54 is a register 176 with both registers having a clear terminal connected to the output of the inverting amplifier 154.

The binary count from the registers 174 and 176 is connected through the identified lines to the like identified lines of the microprocessor 32 of FIG. 5. To extend the count of the counter 54 to twenty-four bits, there is connected to the registers 174 and 176a one-shot multi vibrator 178. Connected to the one-shot multi vibrator 178 is the microprocessor 32 and one terminal of the register 176.

Operationally, the circuits of FIGS. 5 through 7 function as previously described with reference to FIG. 1.

While additional blocks are illustrated in FIG. 1 and not detailed in FIGS. 5 through 7, it will be recognized that these additional blocks encompass conventional circuitry well-known to one skilled in the art to which the invention relates.

Previously, there was described the operation of the system of FIG. 1 with the probe of FIGS. 2 through 4 where the level and volume of fuel within the tank 10 was calculated starting with the top capacitor of the probe 12 and proceeding downward. It should be understood that the microprocessor system 14 may also be programmed to determine liquid level height within the tank 10 by starting at the bottom capacitor and proceeding upward. When determining the liquid level height starting at the bottom capacitor, each measurement count from the counter 54 is compared with the stored, fully empty count in the microprocessor system 14. When the comparison indicates that the measured count is equal the stored count, then the liquid level height has been identified within one capacitor section above the level. The system operation then proceeds as previously described, measuring the capacitance of the first fully submerged capacitor to calculate a correction factor. Using either process that is, starting from the top capacitor or from the bottom capacitor to determine liquid level height the computation of the volume of fuel within the tank is the same.

While the present invention has been described with respect to specific details thereof, it should be understood that various changes and modifications will be suggested to one skilled in the art to which the invention relates, and it is intended to encompass those changes and modifications which fall within the scope of the appended claims.

I claim:

1. An elongated, multiple segment capacitor probe for connection to a micro-processor in a measuring system for location of a liquid level interface, comprising:
    a support including an elongated center section as one plate of a plurality of capacitors,
    a first plurality of capacitor plates mounted in a spaced apart pattern from and parallel to the center section of said support along the longitudinal axis thereof, and
    a second plurality of capacitor plates mounted in a spaced apart pattern from and parallel to the center section of said support in a position opposite and displaced from the first plurality of capacitor plates,
    each of the capacitor plates comprising an individual capacitor for sequential connection to the microprocessor with the second plurality of capacitor plates axially overlapping the capacitor plates of the first plurality to provide a continuous and uninterrupted measurement for location of the liquid level interface.

2. An elongated, multiple segment capacitor probe as set forth in claim 1 including means responsive to the temperature of each of the plurality of capacitors including a plurality of temperature sensors, one positioned in proximity to each of the capacitors.

3. An elongated, multiple segment capacitor probe as set forth in claim 1 wherein each capacitor plate of the first and second plurality comprises an electrically nonconductive substrate with copper sheets attached to opposite faces of the substrate.

4. An elongated, multile segment capcitor probe as set forth in claim 3 wherein the copper sheets on each side of the substrate are electrically interconnected.

5. An elongated multiple segment capacitor probe as set forth in claim 1 including means attached to said support to provide shielding for each capacitor plate.

6. A method of measuring the location of a liquid level in a tank by means of a micro-processor based measuring system sequentially connected by means of oscillator controlled gating logic to an elongated multiple segment capacitance probe that includes a column of capacitors extending in a direction through the liquid level, comprising the steps of:
    charging an identified capacitor in the column by connection to a current source in the measuring system in response to the oscillator controlled gating logic,
    comparing the charge on the identified capacitor by means of a comparator in the measuring system with a reference level stored in the measuring system,
    accumulating a count in a counter of the measuring system in response to the oscillator controlled gating logic until the charge on the identified capacitor equals the reference level, wherein the accumulated count is a measure of the capacitance value of the capacitor, and
    computing the height of the liquid level in the tank by means of the micro-processor from the measured capacitance value of the capacitor in the column at the liquid level.

7. A method of measuring the location of a liquid level in a tank as set forth in claim 6 including the steps of:
    generating a signal representing the ambient temperature of the capacitor in the column below the liquid level,
    computing by means of the micro-processor a temperature compensation factor from the generated ambient temperature signal, and
    computing by means of the micro-processor a corrected height of the liquid level within the tank using the computed height and a temperature compensation factor.

8. A method of measuring the location of a liquid level in a tank by means of a micro-processor based measuring system sequentially connected by means of oscillator controlled gating logic to an elongated multi-segment capacitance probe that includes a column of capacitors extending in a direction through the liquid level, comprising the steps of:

generating and storing data corresponding to the capacitance value for each of the capacitors in the column, sequentially generating a signal representing the capacitance value of each of the capacitors in the column starting at one end thereof, comparing by means of a comparator in the measuring system the generated capacitance value signal for each of the capacitors in the column with the generated data capacitance value therefor, interrupting the sequential generating of the capacitance value signal when a comparison produces a result indicating the liquid level, generating a signal representing the capacitance value of a capacitor in the column below the capacitor at which the comparison indicates a liquid level, and computing the height of the liquid level in the tank by means of the micro-processor from the generated capacitance value signal of the capacitor below the liquid level interface and the generated capacitance value signal of the capacitor at the liquid level interface.

9. A method of measuring the location of the liquid level in a tank as set forth in claim 8 wherein the sequential generating of a signal starts at the top capacitor in the column and proceeds downward, and wherein the comparison of the generated capacitance value signal for a given capacitor in the column is made with generated data representing a capacitance for the dielectric constant of air.

10. The method of measuring the location of the liquid level in a tank as set forth in claim 8 wherein the sequential generating of a signal starts at the bottom capacitor in the column, and wherein the comparison of the generated capacitance value signal for a given capacitor in the column is made with a generated data capacitance value of the capacitor with a dielectric constant of air within the tank.

11. The method of measuring the location of the liquid level in a tank as set forth in claim 8 including the step of generating a signal representing the ambient temperature of a capacitor below the liquid level interface, computing a temperature compensation factor from the generated ambient temperature signal approximately every 6" below the surface, and computing a corrected height of the liquid level interface within the tank using the computed height and the temperature compensation factor.

12. A method of measuring the volume of fuel within a tank by means of a micro-processor based measuring system sequentially connected by means of oscillator controlled gating logic to an elongated multi-segment capacitance probe that includes a column of capacitors extending through a liquid level of the fuel, comprising the steps of:

generating and storing data corresponding to the capacitance value for each of the capacitors in the column, sequentially generating a signal representing the capacitance value of each of the capacitors in the column starting at one end thereof, comparing by means of a comparator in the measuring system the generated capacitance value signal for a given capacitor in the column with the generated data capacitance value thereof, interrupting the sequential generating of the capacitance value signal in the column when the comparison produces a result indicating a liquid level interface, generating a signal representing the capacitance value of a capacitor in the column below the capacitor at which the comparison indicates a liquid level interface, computing the height of the liquid level interface within the tank by means of the micro-processor from the generated capacitance value signal of the capacitor below the interface and the generated capacitance value signal of the capacitor at the interface, and calculating the volume of the fuel within the tank by means of the micro-processor from the computed height and from predetermined volume calibrations.

13. The method of measuring the volume of fuel within a tank as set forth in claim 12 including the steps of:

comparing a generated capacitance value signal for the lowest capacitor in the column with a generated data capacitance value for a capacitor fully immersed in fuel, comparing the generated capacitance value signal of the lowest capacitor in the column with a generated data capacitance value for a capacitor fully immersed in water, computing by means of the micro-processor the volume of water in the tank from the difference in the generated value signal and the fully immersed fuel value and the difference in the generated value signal and the fully immersed in water value, and subtracting the volume of water as computed from the volume of fuel as computed to produce a corrected fuel volume.

14. The method of measuring the volume of fuel within a tank as set forth in claim 12 including the step of generating a signal representing the ambient temperature of all capacitors below the liquid level interface, and computing a corrected volume of liquid within the tank using the computed volume and the generated ambient temperature signal.

15. The method of measuring the volume of fuel within a tank as set forth in claim 12 wherein the sequence of generating the capacitance value signal of the capacitors in the column starts at the top capacitor in the column and continues downward until a capacitor is identified at the liquid level interface.

16. The method of measuring the volume of fuel within a tank as set forth in claim 15 wherein the comparison of the generated capacitance value signal for a given capacitor in the column is made with a generated data value representing the capacitor having a dielectric constance in air.

17. Apparatus for measuring the location of the liquid level in a tank by means of an elongated multiple segment capacitive probe extending in the direction through the liquid level, comprising:

a micro-processor for controlling the connection of a current source by means of oscillator controlled gating logic to the multiple segment capacitance probe, means for charging an identified capacitor in the column by connection to the current source in response to the oscillator controlled gating logic, means for comparing the charge on the identified capacitor with a stored reference level value, a counter for accumulating a count in response to the oscillator control gating logic until the charge on the identified capacitor equals the stored reference level value, wherein the accumulated count is a measure of the capacitance value of the capacitor, and means for computing the height of the liquid level in the tank by means of the micro-processor from the measured capacitance value of the capacitor in the column at the liquid level.

18. Apparatus for measuring the location of the liquid level in a tank as set forth in claim 17 including an intrinsically safe barrier circuit for coupling the current source to the identified capacitor in the capacitance probe.

19. Apparatus for measuring the location of the liquid level in a tank as set forth in claim 17 including;

means for generating a signal representing the ambient temperature of the capacitance probe in the column below the liquid level interface, means for computing a temperature compensation factor from the generated ambient temperature signal, and means for computing a corrected height of the liquid level within the tank using the computed height and a temperature compensation factor.

20. Apparatus for measuring the location of the liquid level in a tank as set forth in claim 17 including means for calculating the volume of liquid within the tank from the computed height of the liquid level and from stored predetermined volume calibrations.

21. Apparatus for measuring the location of the liquid level in a tank as set forth in claim 20 including means for computing a corrected volume of liquid within the tank using the computed volume and a generated ambient temperature signal.

* * * * *